United States Patent
Reial et al.

(10) Patent No.: US 12,452,011 B2
(45) Date of Patent: Oct. 21, 2025

(54) WIRELESS DEVICE, AND METHODS PERFORMED THEREBY, FOR HANDLING RECEPTION OF ONE OR MORE REFERENCE SIGNALS

(71) Applicant: Telefonaktiebolaget LM Ericsson (publ), Stockholm (SE)

(72) Inventors: Andres Reial, Lomma (SE); Sina Maleki, Malmö (SE); Niklas Andgart, Södra Sandby (SE); Ilmiawan Shubhi, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 365 days.

(21) Appl. No.: 18/249,768

(22) PCT Filed: Oct. 20, 2021

(86) PCT No.: PCT/SE2021/051045
§ 371 (c)(1),
(2) Date: Apr. 20, 2023

(87) PCT Pub. No.: WO2022/086415
PCT Pub. Date: Apr. 28, 2022

(65) Prior Publication Data
US 2023/0396380 A1  Dec. 7, 2023

Related U.S. Application Data

(60) Provisional application No. 63/104,548, filed on Oct. 23, 2020.

(51) Int. Cl.
*H04L 5/00* (2006.01)
*H04L 43/0888* (2022.01)

(52) U.S. Cl.
CPC .......... *H04L 5/0048* (2013.01); *H04L 5/0058* (2013.01); *H04L 5/006* (2013.01); *H04L 43/0888* (2013.01)

(58) Field of Classification Search
CPC . H04L 5/006; H04L 43/0876; H04L 43/0888; H04L 5/0058; H04L 5/0048
See application file for complete search history.

(56) References Cited

U.S. PATENT DOCUMENTS 9,698,892 B2 * 7/2017 Horiuchi ............... H04L 5/0073
11,304,171 B2 * 4/2022 Gangakhedkar ........ H04W 4/02
(Continued)

OTHER PUBLICATIONS

International Search Report and Written Opinion dated Jan. 27, 2022 for International Application No. PCT/SE2021/051045 filed Oct. 20, 2021, consisting of 12-pages.
(Continued)

*Primary Examiner* — Raj Jain
(74) *Attorney, Agent, or Firm* — Weisberg I.P. Law, P.A.

(57) ABSTRACT

A method performed by a wireless device operating in a wireless communications network. The wireless device determines information to apply in the wireless device. The information is to receive one or more reference signals (RSs) while the wireless device is in inactive or idle state. The RSs are to be used to perform one or more tasks. The determining is based on one or more criteria. The criteria include a criterion of power consumption, and a target level of accuracy to be achieved in a performance of the tasks. The information includes: a pattern of reception of the RSs, and a configuration of a receiver. The information includes a bandwidth of reception of the RSs. The wireless device receives the RSs based on the determined information. The receiving of the RSs is performed while the wireless device is in inactive or idle state.

20 Claims, 8 Drawing Sheets

(56) References Cited

U.S. PATENT DOCUMENTS

| | | | | |
|---|---|---|---|---|
| 11,419,173 | B2* | 8/2022 | Deenoo | H04W 72/23 |
| 2016/0105815 | A1* | 4/2016 | Sugahara | H04W 24/02 |
| | | | | 370/252 |
| 2016/0278030 | A1* | 9/2016 | Yi | H04W 16/32 |
| 2020/0146095 | A1 | 5/2020 | Hsieh et al. | |
| 2021/0050978 | A1* | 2/2021 | Manolakos | H04L 5/0051 |
| 2021/0204231 | A1* | 7/2021 | Harada | H04L 5/001 |
| 2023/0396380 | A1* | 12/2023 | Reial | H04L 5/005 |

OTHER PUBLICATIONS

3GPP TS 36.331 V15.11.0; 3rd Generation Partnership Project; Technical Specification Group Radio Access Network; Evolved Universal Terrestrial Radio Access (E-UTRA); Radio Resource Control (RRC); Protocol specification (Release 15); Sep. 2020, consisting of 965-pages.

3GPP TS 36.331 V16.2.1; 3rd Generation Partnership Project; Technical Specification Group Radio Access Network; Evolved Universal Terrestrial Radio Access (E-UTRA); Radio Resource Control (RRC); Protocol specification (Release 16); Sep. 2020, consisting of 1081-pages.

3GPP TS 38.211 V15.8.0; 3rd Generation Partnership Project; Technical Specification Group Radio Access Network; NR; Physical channels and modulation (Release 15); Dec. 2019, consisting of 97-pages.

3GPP TS 38.211 V16.3.0; 3rd Generation Partnership Project; Technical Specification Group Radio Access Network; NR; Physical channels and modulation (Release 16); Sep. 2020, consisting of 133-pages.

3GPP TS 38.214 V15.11.0; 3rd Generation Partnership Project; Technical Specification Group Radio Access Network; NR; Physical layer procedures for data (Release 15); Sep. 2020, consisting of 106-pages.

3GPP TS 38.214 V16.3.0; 3rd Generation Partnership Project; Technical Specification Group Radio Access Network; NR; Physical layer procedures for data (Release 16); Sep. 2020, consisting of 166-pages.

3GPP TSG RAN WG1#89 R1-1708238; Title: CSI-RS for mobility purposes; Agenda Item: 7.1.1.5.2; Source: Nokia, Alcatel-Lucent Shanghai Bell; Document for: Discussion and Decision; Date and Location: May 15-19, 2017, Hangzhou, P.R. China, consisting of 9-pages.

3GPP TSG RAN WG1 #102-e R1-2005389; Title: Discussion on TRS/CSI-RS occasion(s) for idle/inactive UEs; Agenda Item: 8.7.1.2; Source: Vivo; Document for: Discussion and Decision; Date and Location: Aug. 17-28, 2020, e-meeting, consisting of 7-pages.

3GPP TS 38.211 V16.0.0; 3rd Generation Partnership Project; Technical Specification Group Radio Access Network; NR; Physical channels and modulation (Release 16); Dec. 2019, consisting of 129-pages.

3GPP TS 38.331 V15.8.0; 3rd Generation Partnership Project; Technical Specification Group Radio Access Network; NR; Radio Resource Control (RRC) protocol specification (Release 15); Dec. 2019, consisting of 532-pages.

* cited by examiner a)

b)

a)

b)

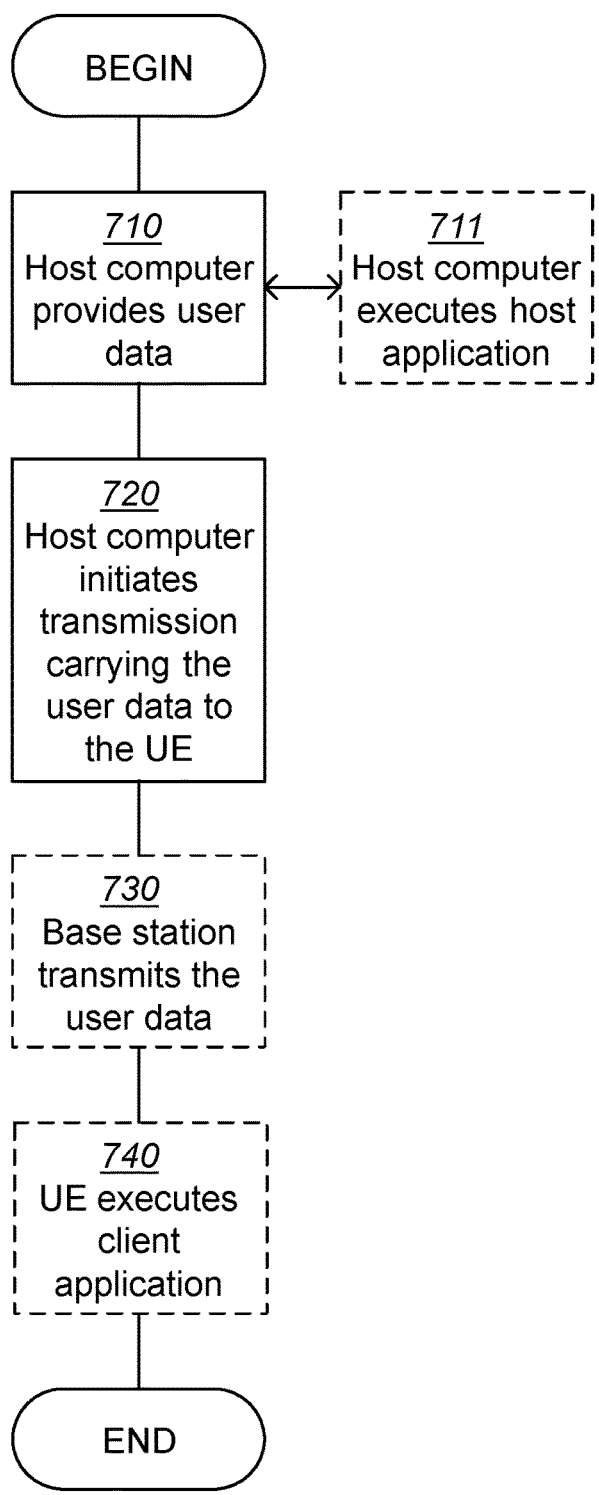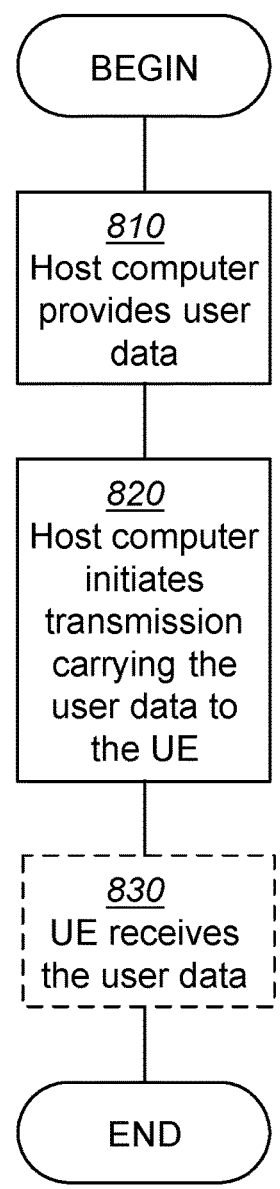
FIG. 7
FIG. 8

WIRELESS DEVICE, AND METHODS PERFORMED THEREBY, FOR HANDLING RECEPTION OF ONE OR MORE REFERENCE SIGNALS

CROSS-REFERENCE TO RELATED APPLICATIONS

This application is a Submission Under 35 U.S.C. § 371 for U.S. National Stage Patent Application of International Application No.: PCT/SE2021/051045, filed Oct. 20, 2021 entitled "WIRELESS DEVICE, AND METHODS PERFORMED THEREBY, FOR HANDLING RECEPTION OF ONE OR MORE REFERENCE SIGNALS," which claims priority to U.S. Provisional Application No. 63/104,548, filed Oct. 23, 2020, entitled "WIRELESS DEVICE, AND METHODS PERFORMED THEREBY, FOR HANDLING RECEPTION OF ONE OR MORE REFERENCE SIGNALS," the entireties of both of which are incorporated herein by reference.

TECHNICAL FIELD

The present disclosure relates generally to a wireless device and methods performed thereby for handling reception of one or more reference signals. The present disclosure further relates generally to computer programs and computer-readable storage mediums, having stored thereon the computer programs to carry out these methods.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc . . . , based on transmission power and thereby also cell size. A cell is the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying, that is, defining technical specifications for, a New Radio (NR), e.g., 5G, Interface called NR or 5G-UTRA, as well as a Fifth Generation (5G) Packet Core Network, which may be referred to as Next Generation (NG) Core Network, abbreviated as NG-CN, NGC or 5G CN.

In release 15 (Rel-15) NR, a user equipment (UE) may be configured with up to four carrier bandwidth parts (BWPs) in the downlink, with a single downlink carrier bandwidth part being active at a given time. A UE may be configured with up to four carrier bandwidth parts in the uplink, with a single uplink carrier bandwidth part being active at a given time. If a UE is configured with a supplementary uplink, the UE may additionally be configured with up to four carrier bandwidth parts in the supplementary uplink, with a single supplementary uplink carrier bandwidth part being active at a given time.

For a carrier bandwidth part with a given numerology $\mu$, a contiguous set of physical resource blocks (PRBs) may be defined and numbered from 0 to $N_{BWP,i}^{size}-1$, where i may be understood as the index of the carrier bandwidth part. A resource block (RB) may be defined as 12 consecutive subcarriers in the frequency domain.

Multiple orthogonal frequency-division multiplexing (OFDM) numerologies, $\mu$, may be supported in NR as given by Table 1, where the subcarrier spacing, $\Delta f$, and the cyclic prefix for a carrier bandwidth part may be configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel may be understood to correspond to a set of resource elements carrying information originating from higher layers. The following downlink physical channels may be defined: Physical Downlink Shared Channel (PDSCH), Physical Broadcast Channel (PBCH), and Physical Downlink Control Channel (PDCCH).

PDSCH may be understood as the main physical channel used for unicast downlink data transmission, but also for transmission of random access response (RAR), certain system information blocks, and paging information. PBCH may be understood to carry the basic system information, that may be required by the UE to access the network. PDCCH may be used for transmitting downlink control information (DCI), mainly scheduling decisions, that may be required for reception of PDSCH, and for uplink scheduling grants enabling transmission on the Physical Uplink Shared Channel (PUSCH).

An uplink physical channel may be understood to correspond to a set of resource elements carrying information originating from higher layers. The following uplink physical channels may be defined: PUSCH, Physical Uplink Control Channel (PUCCH), and Physical Random Access Channel (PRACH).

PUSCH may be understood as the uplink counterpart to the PDSCH. PUCCH may be used by UEs to transmit uplink control information, including Hybrid Automatic Repeat Request (HARQ) acknowledgements, channel state information reports, etc. PRACH may be used for random access preamble transmission.

NR Reference Symbols

The ultra-lean design principle in NR aims to minimize the always-on transmissions that may exist in earlier systems, e.g., LTE CRS reference symbols. Instead, NR may be understood to provide reference symbols such as Synchronization Signal (SS) blocks (SSBs) on a periodic basis, by default once every 20 milliseconds (ms). In addition, for connected mode UEs, typically a set of reference symbols may be provided for optimal link performance. Some of these reference symbols are clarified below.

Channel State Information Reference Signal (CSI-RS) for Tracking

A UE in Radio Resource Control (RRC) connected mode may be expected to receive from the network (NW the RRC layer UE specific configuration of a Non Zero Power (NZP)-CSI-RS-ResourceSet configured including the parameter trs-Info. For a NZP-CSI-RS-ResourceSet configured with the higher layer parameter trs-Info set to "true", the UE may be required to assume the antenna port with the same port index of the configured NZP CSI-RS resources in the NZP-CSI-RS-ResourceSet is the same.

For frequency range 1 (FR1), the UE may be configured with one or more NZP CSI-RS set(s), where a NZP-CSI-RS-ResourceSet may consist of four periodic NZP CSI-RS resources in two consecutive slots with two periodic NZP CSI-RS resources in each slot. If no two consecutive slots are indicated as downlink slots by Time Division Duplex (tdd)-UL-DL-Configuration-Common or tdd-UL-DL-ConfigDedicated, then the UE may be configured with one or more NZP CSI-RS set(s), where a NZP-CSI-RS-ResourceSet may consist of two periodic NZP CSI-RS resources in one slot.

For frequency range 2 (FR2), the UE may be configured with one or more NZP CSI-RS set(s), where a NZP-CSI-RS-ResourceSet may consist of two periodic CSI-RS resources in one slot or with a NZP-CSI-RS-ResourceSet of four periodic NZP CSI-RS resources in two consecutive slots with two periodic NZP CSI-RS resources in each slot.

A UE configured with NZP-CSI-RS-ResourceSet(s) configured with higher layer parameter trs-Info may have the CSI-RS resources configured as:

Periodic, with the CSI-RS resources in the NZP-CSI-RS-ResourceSet configured with same periodicity, bandwidth (BW) and subcarrier location.

Periodic CSI-RS resource in one set and aperiodic CSI-RS resources in a second set, with the aperiodic CSI-RS and periodic CSI-RS resource having the same bandwidth, with same RB location, and the aperiodic CSI-RS being 'QCL-Type-A' and 'QCL-TypeD', where applicable, with the periodic CSI-RS resources. For frequency range 2, the UE may not expect that the scheduling offset between the last symbol of the PDCCH carrying the triggering DCI and the first symbol of the aperiodic CSI-RS resources is smaller than the UE reported ThresholdSched-Offset. The UE may be required to expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodicTriggering-Offset may indicate the triggering offset for the first slot for the first two CSI-RS resources in the set.

A UE may not expect to be configured with a CSI-ReportConfig that may be linked to a CSI-ResourceConfig containing an NZP-CSI-RS-Resource Set configured with trs-Info and with the CSI-ReportConfig configured with the higher layer parameter timeRestrictionForChannelMeasurements set to 'configured'.

A UE may not expect to be configured with a CSI-ReportConfig with the higher layer parameter reportQuantity set to other than 'none' for aperiodic NZP CSI-RS resource set configured with trs-Info.

A UE may not expect to be configured with a CSI-ReportConfig for periodic NZP CSI-RS resource set configured with trs-Info.

A UE may not expect to be configured with a NZP-CSI-RS-ResourceSet configured both with trs-Info and repetition.

Each CSI-RS resource, defined in Clause 7.4.1.5.3 of [TS 38.211, v. 16.0.0], may be configured by the higher layer parameter NZP-CSI-RS-Resource with the following restrictions:

the time-domain locations of the two CSI-RS resources in a slot, or of the four CSI-RS resources in two consecutive slots, which may be the same across two consecutive slots, as defined by higher layer parameter CSI-RS-resourceMapping, may be given by one of l∈{4,8}, l∈{5,9}, or l∈{6,10} for frequency range 1 and frequency range 2, l∈{0,4}, l∈{1,5}, l∈{2,6}, l∈{3,7}, l∈{7,11}, l∈{8, 12} or l∈{9,13} for frequency range 2.

a single port CSI-RS resource with density ρ=3 given by Table 7.4.1.5.3-1 from [TS 38.211, v. 16.0.0] and higher layer parameter density configured by CSI-RS-ResourceMapping.

the bandwidth of the CSI-RS resource, as given by the higher layer parameter freqBand configured by CSI-RS-ResourceMapping, is the minimum of 52 and $N_{BWP,i}^{size}$ resource blocks, or is equal to $N_{BWP,i}^{size}$ resource blocks. For operation with shared spectrum channel access, freqBand configured by CSI-RS-ResourceMapping, is the minimum of 48 and $N_{BWP,i}^{size}$ resource blocks, or is equal to $N_{BWP,i}^{size}$ resource blocks.

the UE is not expected to be configured with the periodicity of $2^\mu \times 10$ slots if the bandwidth of CSI-RS resource is larger than 52 resource blocks.

the periodicity and slot offset for periodic NZP CSI-RS resources, as given by the higher layer parameter periodicityAndOffset configured by NZP-CSI-RS-Resource, is one of $2^\mu X_p$ slots where x=10, 20, 40, or 80 and where μ is defined in Clause 4.3 of [TS 38.211, v. 16.0.0].

same powerControlOffset and powerControlOffsetSS given by NZP-CSI-RS-Resource value across all resources.

NZP CSI-RS

The UE may be configured with one or more NZP CSI-RS resource set configuration(s) as indicated by the higher layer parameters CSI-ResourceConfig, and NZP-CSI-RS-ResourceSet. Each NZP CSI-RS resource set may consist of K≥1 NZP CSI-RS resource(s).

The following parameters for which the UE may be required to assume non-zero transmission power for CSI-RS resource may be configured via the higher layer parameter NZP-CSI-RS-Resource, CSI-ResourceConfig and NZP-CSI-RS-Resource Set for each CSI-RS resource configuration:

nzp-CSI-RS-ResourceId may be understood to determine CSI-RS resource configuration identity.

periodicityAndOffset may be understood to define the CSI-RS periodicity and slot offset for periodic/semi-persistent CSI-RS. All the CSI-RS resources within one set may be configured with the same periodicity, while the slot offset may be same or different for different CSI-RS resources.

resourceMapping may be understood to define the number of ports, Code Division Multiplexing (CDM)-type, and OFDM symbol and subcarrier occupancy of the CSI-RS resource within a slot that are given in Clause 7.4.1.5 of [TS 38.211, v. 16.0.0].

nrofPorts in resourceMapping may be understood to define the number of CSI-RS ports, where the allowable values are given in Clause 7.4.1.5 of [TS 38.211, v. 16.0.0].

density in resourceMapping may be understood to define CSI-RS frequency density of each CSI-RS port per PRB, and CSI-RS PRB offset in case of the density value of ½, where the allowable values are given in Clause 7.4.1.5 of [TS 38.211 v. 16.0.0]. For density ½, the odd/even PRB allocation indicated in density may be with respect to the common resource block grid.

cdm-Type in resourceMapping may be understood to define CDM values and pattern, where the allowable values are given in Clause 7.4.1.5 of [TS 38.211, v. 16.0.0].

powerControlOffset: which may be understood to be the assumed ratio of PDSCH EPRE to NZP CSI-RS EPRE when UE may derive Channel State Information (CSI) feedback and may take values in the range of [−8, 15] dB with 1 dB step size.

powerControlOffsetSS: which may be understood to be the assumed ratio of NZP CSI-RS EPRE to SS/PBCH block EPRE.

scramblingID may be understood to define scrambling ID of CSI-RS with length of 10 bits.

BWP-Id in CSI-ResourceConfig may be understood to define which bandwidth part the configured CSI-RS is located in.

repetition in NZP-CSI-RS-ResourceSet may be associated with a CSI-RS resource set and may define whether a UE may assume the CSI-RS resources within the NZP CSI-RS Resource Set may be transmitted with the same downlink spatial domain transmission filter or not as described in Clause 5.1.6.1.2. and may be configured only when the higher layer parameter reportQuantity associated with all the reporting settings linked with the CSI-RS resource set is set to 'cri-RSRP', 'cri-SINR' or 'none'.

qcl-InfoPeriodicCSI-RS may be understood to contain a reference to a Transmission Configuration Indicator (TCI)-State indicating QCL source RS(s) and QCL type(s). If the TCI-State is configured with a reference to an RS with 'QCL-TypeD' association, that RS may be an SS/PBCH block located in the same or different CC/DL BWP or a CSI-RS resource configured as periodic located in the same or different CC/DL BWP.

trs-Info in NZP-CSI-RS-ResourceSet may be understood to be associated with a CSI-RS resource set and for which the UE may assume that the antenna port with the same port index of the configured NZP CSI-RS resources in the NZP-CSI-RS-ResourceSet is the same as described in Clause 5.1.6.1.1 and may be configured when reporting setting may not be configured or when the higher layer parameter reportQuantity associated with all the reporting settings linked with the CSI-RS resource set may be set to 'none'.

All CSI-RS resources within one set may be configured with same density and same nrofPorts, except for the NZP CSI-RS resources used for interference measurement.

The UE may expect that all the CSI-RS resources of a resource set may be configured with the same starting RB and number of RBs and the same cdm-type.

The bandwidth and initial common resource block (CRB) index of a CSI-RS resource within a BWP, as defined in Clause 7.4.1.5 of [TS 38.211, v. 16.0.0], may be determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB may be configured as integer multiples of 4 RBs, and the reference point for startingRB is CRB 0 on the common resource block grid. If startingRB<$N_{BWP}^{start}$, the UE may be required to assume that the initial CRB index of the CSI-RS resource is $N_{initial\ RB}$=$N_{BWP}^{start}$, otherwise $N_{initial\ RB}$=startingRB. If nrofRBs>$N_{BWP}^{size}$+$N_{BWP}^{start}$−$N_{initial\ RB}$, the UE may be required to assume that the bandwidth of the CSI-RS resource is $N_{CSI-RS}^{BW}$=$N_{BWP}^{size}$+$N_{BWP}^{start}$−$N_{initial\ RB}$, otherwise $N_{CSI-RS}^{BW}$=nrofRBs. In all cases, the UE may expect that $N_{CSI-RS}^{BW}$≥min(24,$N_{BWP}^{size}$).

Existing methods for wireless devices to receive reference signals may result in wasted resources at the wireless devices.

SUMMARY

As part of the development of embodiments herein, one or more challenges with the existing technology will first be identified and discussed.

In NR, work is ongoing to enable idle mode UEs to utilize RSs typically configured for connected mode. This may be enabled via additional signaling or opportunities that may be discovered by UEs autonomously. In some scenarios, the UE may utilize Tracking Reference Signal (TRS) or CSI-RS to replace SSB-based measurement, or loop convergence occasions if that may provide power saving gains, e.g., if it may allow reducing total Radio Frequency (RF) on-time and/or time spent outside deep sleep.

While the usefulness of utilizing additional RSs instead of SSB in some situations has been established, simply replacing an SSB measurement with a TRS/CSI-RS measurement may not be optimal from Power Saving (PS) considerations due to the different temporal and frequency structure of these signals, e.g., a TRS signal may typically span two consecutive slots with respect to SSB, which may be confined to a single slot. Some general principles have been provided for TRS reception BW selection, however a consistent framework for TRS reception BW selection and overall power optimization is not available. There may thus be understood to be a need for methods for selecting additional RS occasions and measurement configurations that may provide sufficient performance and minimize power consumption.

It is an object of embodiments herein to improve the handling of reception of one or more reference signals.

According to a first aspect of embodiments herein, the object is achieved by a method, performed by a wireless device. The wireless device operates in a wireless communications network. The wireless device determines information to apply in the wireless device. The information is to receive one or more reference signals while the wireless device is in one or inactive state or idle state. The one or more reference signals are to be used by the wireless device to perform one or more tasks. The determining is based on one or more criteria. The one or more criteria comprise a criterion of power consumption, and a target level of accuracy to be achieved in a performance of the one or more tasks. The information comprises: a) a pattern of reception of the one or more reference signals, and b) a configuration of a receiver of the wireless device. The information comprises a bandwidth of reception of the one or more reference signals. The wireless device also receives the one or more reference signals based on the determined information. The receiving of the one or more reference signals is performed while the wireless device is in one or inactive state or idle state.

According to a second aspect of embodiments herein, the object is achieved by the wireless device. The wireless device is configured to operate in the wireless communications network. The wireless device is further configured to determine the information to apply in the wireless device. The information is configured to be to receive the one or more reference signals while the wireless device is in one or inactive state or idle state. The one or more reference signals are configured to be used by the wireless device to perform the one or more tasks. The determining is configured to be based on the one or more criteria. The one or more criteria are configured to comprise the criterion of power consumption, and the target level of accuracy to be achieved in the performance of the one or more tasks. The information is configured to comprise: a) the pattern of reception of the one or more reference signals, and b) the configuration of the receiver of the wireless device. The information is configured to comprise the bandwidth of reception of the one or more reference signals. The wireless device is further configured to receive the one or more reference signals based on the information configured to be determined. The receiving of the one or more reference signals is configured to be performed while the wireless device is in one or inactive state or idle state.

According to a third aspect of embodiments herein, the object is achieved by a computer program, comprising instructions which, when executed on at least one processor, cause the at least one processor to carry out the method performed by the wireless device.

According to a fourth aspect of embodiments herein, the object is achieved by a computer-readable storage medium, having stored thereon the computer program, comprising instructions which, when executed on at least one processor, cause the at least one processor to carry out the method performed by the wireless device.

By the wireless device determining the information, the wireless device may be enabled to select the pattern of reception of the one or more reference signals, such as e.g., symbol timings and the configuration of the receiver, e.g., a customized BW for each symbol, additional RS occasions and measurement configurations. The bandwidth of reception of the one or more reference signals may be also referred to as an "RS reception bandwidth" or a number of units, e.g., RE, of the one or more reference signals in frequency, which may be also referred to as "number of REs in frequency". By the determining being based on the one or more criteria comprising the criterion of power consumption, and the target level of accuracy to be achieved in the performance of the one or more tasks, the wireless device may be enabled to determine the information based on, maximizing energy savings gain, adapting the configuration to the target level of accuracy. This may be achieved by the wireless device being enabled to determine a trade-off between reduced time of monitoring and additional instantaneous power consumed due to operation over a wider bandwidth. For example, the wireless device may be enabled to determine whether to operate a wider BW if this may allow collecting a sufficient number of REs during a shorter monitoring time interval.

BRIEF DESCRIPTION OF THE DRAWINGS

Examples of embodiments herein are described in more detail with reference to the accompanying drawings, according to the following description.

FIG. 7 is a flowchart depicting embodiments of a method in a communications system including a host computer, a base station and a user equipment, according to embodiments herein.

FIG. 8 is a flowchart depicting embodiments of a method in a communications system including a host computer, a base station and a user equipment, according to embodiments herein.

DETAILED DESCRIPTION

Certain aspects of the present disclosure and their embodiments may provide solutions to the challenges described in the Summary section or other challenges. Embodiments herein may be understood to relate to UE selection of TRS reception configuration in idle state. According to embodiments herein, a UE may select a receiver configuration for TRS reception for synchronization, measurement, or other purposes based on a required performance. In some examples, the configuration may include at least reception bandwidth, number of TRS/CSI-RS, and optionally, SSB occasions, and number of TRS/CSI-RS symbols to utilize per occasion.

As a general principle, the UE may extract the number of TRS/CSI-RS REs that may provide the required processing quality, depending on current receiver status, e.g., existing synchronization accuracy, channel quality, e.g., Signal To Interference Noise Ratio (SINR), and following operations to be supported, e.g., PDCCH/PDSCH reception requirements, interference resistance, depending on TRS/CSI-RS sequence properties, etc. In particular, the UE may receive a partial signal BW, adjust selectivity filter quality.

As the general objective to reduce energy consumption may typically entail minimizing receiver on-time and minimizing intermediate non-deep sleep periods, the UE may operate a wider BW if this may allow collecting a sufficient number of REs during a shorter monitoring time interval.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Figure 1:
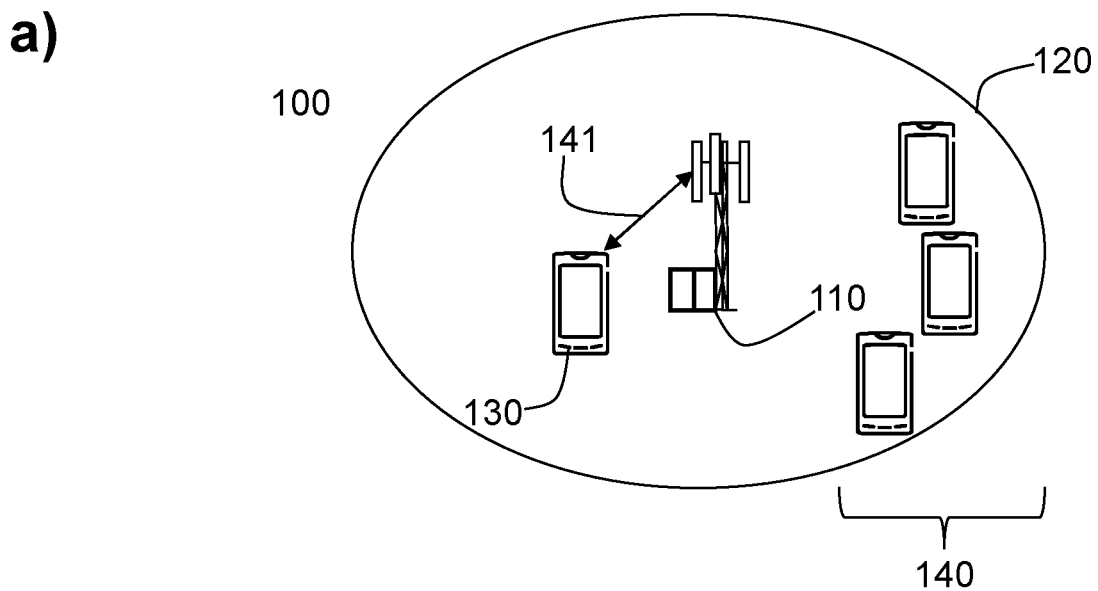
FIG. 1 is a schematic diagram depicting an example of a wireless communications network, according to embodiments herein.
Figure 1:
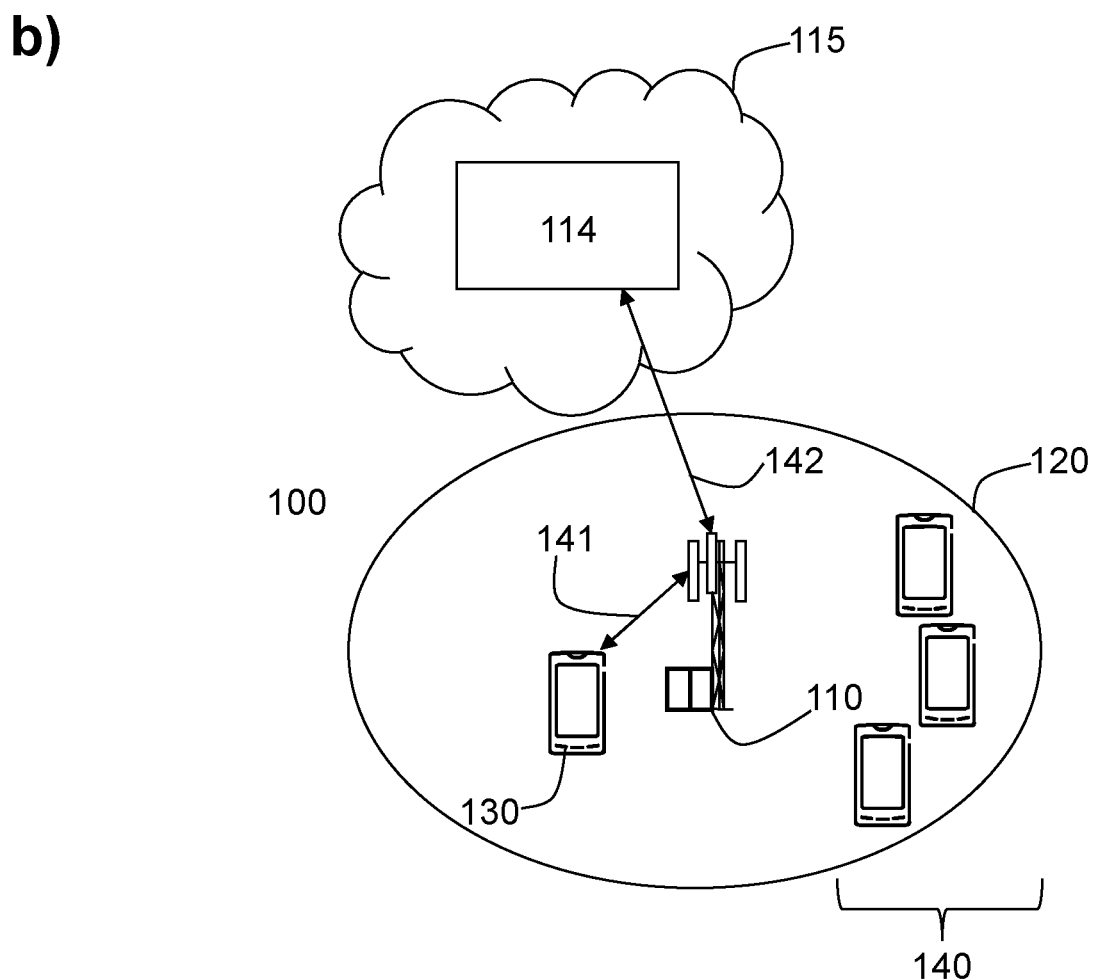

FIG. 1 depicts two non-limiting examples, in panel a) and panel b), respectively, of a wireless network or wireless communications network 100, sometimes also referred to as a wireless communications system, cellular radio system, or cellular network, in which embodiments herein may be implemented. The wireless communications network 100 may support Machine Type Communication (MTC), enhanced Machine Type Communication (eMTC), Internet of Things (IoT) and/or Narrowband Internet of Things (NB-IoT). The wireless communications network 100 may be a 5G system, 5G network, or Next Gen System or network. In other examples, the wireless communications network 100 may instead, or in addition, support other technologies such as, for example, Long-Term Evolution (LTE), e.g., LTE for Machines (LTE-M), LTE Frequency Division Duplex (FDD), LTE Time Division Duplex (TDD), LTE Half-Duplex Frequency Division Duplex (HD-FDD), LTE operating in an unlicensed band, such as LTE Licensed-Assisted Access (LAA), Enhanced Licensed Assisted Access (eLAA), Further Enhanced LAA (feLAA) and/or MulteFire. Yet in other examples, the wireless communications network 100 may support other technologies such as, for example Wideband Code Division Multiple Access (WCDMA), Universal Terrestrial Radio Access (UTRA) TDD, Global System for Mobile communications (GSM) network, GSM/Enhanced Data Rates for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system.

The wireless communications network 100 may comprise a plurality of network nodes, whereof a network node 110 is depicted in the non-limiting example of FIG. 1. The network node 110 is a radio network node. That is, a transmission point such as a radio base station, for example a gNB, an eNB, an eNodeB, or a Home Node B, a Home eNode B, or any other network node with similar features capable of serving a user equipment, such as a wireless device or a machine type communication device, in the wireless communications network 100. In some examples, such as that depicted in FIG. 1b, the network node 110 may be a distributed node, and may partially perform its functions in collaboration with a virtual node 114 in a cloud 115.

The wireless communications network 100 may cover a geographical area, which in some embodiments may be divided into cell areas, wherein each cell area may be served by a radio network node, although, one radio network node may serve one or several cells. In the example of FIG. 1, the network node 110 serves a cell 120. The network node 110 may be of different classes, such as, e.g., macro eNodeB, home eNodeB or pico base station, based on transmission power and thereby also cell size. In some examples, the network node 110 may serve receiving nodes with serving beams. The radio network node may support one or several communication technologies, and its name may depend on the technology and terminology used. Any of the radio network nodes that may be comprised in the communications network 100 may be directly connected to one or more core networks.

A plurality of wireless devices may be located in the wireless communication network 100, whereof a wireless device 130, is depicted in the non-limiting example of FIG. 1. Also depicted is a group of other wireless devices 140. The wireless device 130 and/or any of the wireless devices in the group of other wireless devices 140 comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. Any of the wireless devices comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, a sensor, IoT device, NB-IoT device, device equipped with a wireless interface, such as a printer or a file storage device, modem, or any other radio network unit capable of communicating over a radio link in a communications system. The wireless device 130 comprised in the wireless communications network 100 may be enabled to communicate wirelessly in the wireless communications network 100. The communication may be performed e.g., via a RAN, and possibly the one or more core networks, which may be comprised within the wireless communications network 100.

The wireless device 130 may be configured to communicate within the wireless communications network 100 with the network node 110 over a first link 141, e.g., a radio link. The network node 110 may be configured to communicate within the wireless communications network 100 with the virtual network node 114 over a second link 142, e.g., a radio link or a wired link. Any of the wireless devices in the group of other wireless devices 140 may be understood to be configured to communicate within the wireless communications network 100 with the network node 110 over a respective first link, e.g., a radio link, which is not depicted in FIG. 1 to simplify the figure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first" and/or "second" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the wireless device 130, e.g., a 5G UE or a UE.

Figure 2:
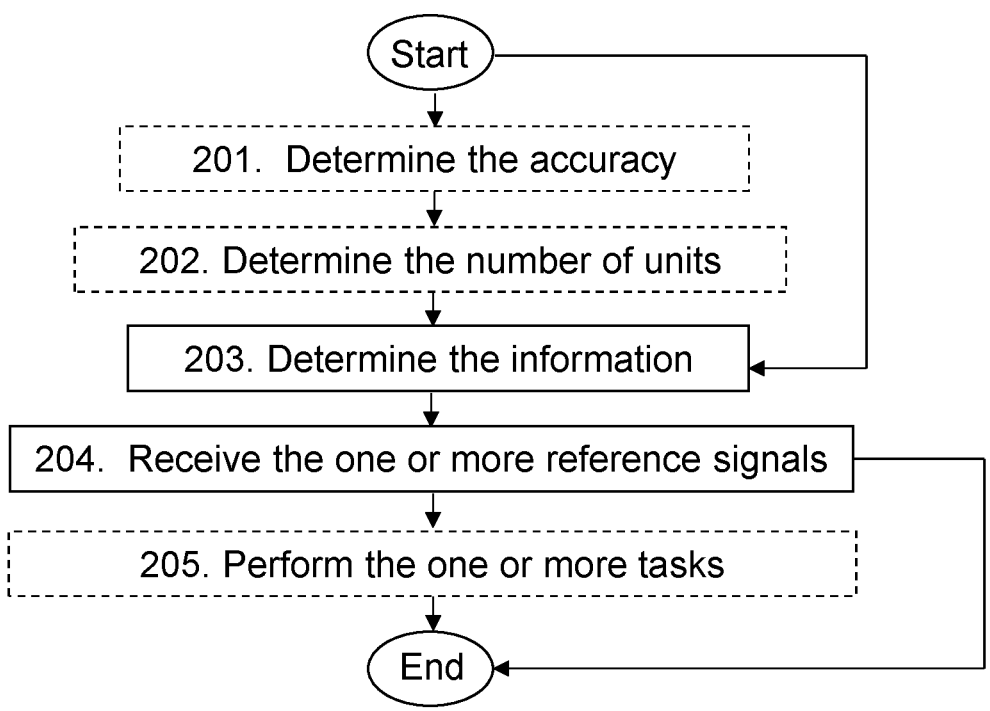
FIG. 2 is a flowchart depicting a method in a wireless device, according to embodiments herein.

Embodiments of a method, performed by the wireless device 130, will now be described with reference to the flowchart depicted in FIG. 2. The method may be understood to be for handling reception of one or more reference signals. The wireless device 130 operates in the wireless communications network 100.

In some embodiments, the wireless communications network 100 may support at least one of: New Radio (NR), Long Term Evolution (LTE), LTE for Machines (LTE-M), enhanced Machine Type Communication (eMTC), and Narrow Band Internet of Things (NB-IoT).

The method may be understood to be a computer-implemented method.

The first method may comprise two or more of the following actions. In some embodiments, all the actions may be performed. One or more embodiments may be combined, where applicable. Components from one embodiment may be tacitly assumed to be present in another embodiment and it will be obvious to a person skilled in the art how those components may be used in the other exemplary embodiments. All possible combinations are not described to simplify the description. A non-limiting example of the method performed by the wireless device 130 is depicted in FIG. 2. In FIG. 2, optional actions in some embodiments may be represented with dashed lines.

Action 201

In this Action 201, the wireless device 130 may determine a target level of accuracy to be achieved in a performance of one or more tasks.

Determining in this Action 201 may comprise deciding or calculating.

The one or more tasks may comprise performing processing operations, e.g. to achieve Time/Frequency (T/F) synchronization or to perform link quality measurements. For example, a processing operation may be a receiver processing operation, e.g., sync quality, measurement quality.

In this action 201, the wireless device 130 may determine the target, e.g., required, accuracy or performance metric for upcoming processing for which TRS may be utilized. Some examples of such accuracy may be: required frequency or timing error after synchronization, e.g., in OFDM symbols or ms, or as a fraction of Subcarrier Spacing (SCS), parts per million (ppm) of carrier frequency, or Hz, power measurement error after correlation with a reference sequence, e.g., error in dB, etc. The metric employed to determine the required accuracy may be e.g., the required PDCCH/PDSCH decoding Block Error Rate (BLER). The BLER may be affected by the coding format of the PDCCH/PDSCH, e.g., aggregation level and DCI format for PDCCH, and the Modulation and Coding Scheme (MCS) and Transport Block (TB) scaling for the PDSCH. In addition, the target accuracy may also be affected by the channel and interference conditions, since interference and imperfections may be understood to add up with the frequency and timing errors, decreasing decoding performance.

By determining the target level of accuracy in this Action 201, the wireless device 130 may be enabled to then determine a number of units of one or more reference signals that may have to be received in the next Action 202, and information to receive the one or more reference signals while the wireless device 130 is in one or inactive state or idle state in Action 203. This may in turn enable the wireless device 130 to maximize power savings while maintaining the desired accuracy of performance of the one or more tasks.

Action 202

In this Action 202, the wireless device 130 may determine, based on the determined target level of accuracy, a number of units of one or more reference signals that may have to be received.

The one or more reference signals comprise at least one of: a Tracking Reference Signal (TRS), a Synchronization Signal Block (SSB), and Channel State Information Reference Signal (CSI-RS).

In some examples, the RS may be TRS.

In some examples, the RS may be SSB, and the required number of RS REs may correspond to SSB subcarriers and/or SSB occasions.

The number of units may be of the one or more reference signals that may be necessary to be received, e.g., to achieve the determined target level of accuracy or performance. The one or more reference signals may be understood to be used by the wireless device 130 to perform the one or more tasks.

The units may be time-frequency units, e.g., resource elements (REs).

In some particular examples, in this Action 202 the wireless device 130 may determine the number of REs that may be required to obtain the target accuracy/performance, e.g., given link quality, receiver state, also including coherently combining constraints. In one example, the required number of REs for processing may be precomputed for different target levels and channel qualities, e.g., Signal to Interference Noise Ratio (SINR), Synchronization Signal Reference Signal Received Quality (SS-RSRQ), Synchronization Signal Reference Signal Received Power (SS-RSRP), Discontinuous Reception (DRX) cycle length, the number of Receiver/Reception (RX) antennas, a specific doppler frequency drift, e.g., estimated based on previous measurements using e.g., SSB, TRS, CSI-RS for mobility, or any other potential CSI-RS available to idle UEs, or a maximum of expected doppler frequency drift, based on a previous synchronization instance or Doppler estimation using other RS. The time since the wireless device 130 last time had adequate synchronization may also affect the initial frequency error. For example, the wireless device 130 may drift more in terms of initial frequency error if the DRX length is higher. Similarly, if the synchronization is successfully performed in the previous cycle, then the initial synchronization error, e.g., frequency drift may be lower, while if a synchronization were not done in the previous cycle, e.g., possibly by design to save power, the expected frequency drift may be higher. In another example, e.g., if the wireless device 130 employs a higher a number of RX antennas, it may tolerate a higher synchronization error to achieve a specific PDCCH/PDSCH BLER. Additionally, the number of REs may be a function of the current UE operating status, e.g., existing T/F synchronization quality or Radio Frequency (RF) receiver operation mode.

In one example, the required number of REs may be expressed in terms of the required processing gain from TRS. In non-fading or slowly-varying environments, the wireless device 130 may use all available REs for coherent combining and the processing gain from using $N_s$ REs $G(N_s)=N_s$.

In one example, the wireless device 130 may additionally consider the impact of frequency and time diversity, e.g., dispersion, Doppler spread, to assess the ability to perform coherent averaging. Depending on the coherence BW and coherence time of the channel, subsets of REs may be combined coherently and non-coherent averaging of per-subset results may be applied. The processing gain from using $N_s$ REs in $N_g$ groups $G(N_s)=N_s/sqrt(N_g)$, or $G(N_s)=sqrt(N_s N_c)$ where $N_c$ may be the number of coherent REs, $N_g=N_s/N_c$. The number of groups may be selected so that all REs in a group may remain within the coherence time/frequency.

As an example, let a Look-up table (LUT) provide the information that the wireless device 130, at SINR=−5 dB, requires processing gain of 23 dB to obtain frequency estimate within 300 Hz of the true value. Let the wireless device 130 estimate that the dispersion is high and channel coherence BW is 10 REs. The number of REs required may then be $200^2/10=4000$, if no inter-symbol averaging may be performed.

The same principles of determining the required number of REs may also be applied to conventional Synchronization Signal Block (SSB) reception, whereby the number of captured REs, e.g., subcarriers, may be reduced at higher SINRs to reduce the RF and front end operating power.

The same criterion of required number of REs may also be used for determining the required number of SSB occasions in the absence of TRS. If frequency variations are slow, the group size Nc may be set to the number of REs available per SSB, e.g. the 168 REs in SSS.

Similarly, these principles may be applied to CSI-RS reception for receiver preparation purposes.

By determining the number of units of the one or more reference signals that may have to be received in this Action 202 based on the determined target level of accuracy, the wireless device 130 may be enabled to then determine the information to receive the one or more reference signals while the wireless device 130 is in one or inactive state or idle state in the next Action 203. This may in turn enable the wireless device 130 to maximize power savings while maintaining the desired accuracy of performance of the one or more tasks.

Action 203

In some of the embodiments, the wireless device 130 determines information, e.g., one or more settings, to apply in the wireless device 130. The information is to receive the one or more reference signals while the wireless device 130 is in one or inactive state or idle state. The one or more reference signals are to be used by the wireless device 130 to perform the one or more tasks.

The inactive state may be, e.g., as defined in 5G or in a younger system having equivalent functionality. In some examples, the receiving of the one or more reference signals may be to be performed while the wireless device 130 is in one of inactive state, idle state or dormant state.

Embodiments herein may assume that the wireless device 130 may have obtained information, e.g., other information, or autonomously established that the one or more reference signals, e.g., TRS/CSI-RS, may be available to be used in idle mode.

In embodiments herein, the focus of the examples may be on exploitation of TRS. Nevertheless, similar mechanisms may be applicable to other potential CSI-RSs employed by an idle UE, e.g., CSI-RS for mobility. Furthermore, when referring to idle mode, it may be related to a UE which may operate either in RRC_Idle or RRC_Inactive state.

Once the TRS availability and configuration may have been established, the wireless device 130 may determine the reception configuration including resource selection in both time- and frequency-domains.

In an earlier approach, an implicit assumption was that the TRS receiver may operate with same BW configuration as the traditional SSB receiver. In embodiments herein, the additional assumption may be made that the wireless device 130 may vary its BW setting for different TRS and SSB reception occasions. A TRS occasion may then be treated not just as a replacement for an SSB, but as an opportunity to obtain a larger number of REs that may potentially replace multiple SSB occasions.

The determining in this Action 203 is based on one or more criteria. The one or more criteria comprise a) a criterion of power consumption, such as e.g., achieving a minimum power consumption, and b) a target level of accuracy to be achieved in the performance of the one or more tasks. The information comprises a pattern of reception of the one or more reference signals, and a configuration of a receiver of the wireless device 130. The information comprises a bandwidth of reception of the one or more reference signals.

The pattern of reception of the one or more reference signals may be also referred to as a "RS reception pattern", such as e.g., symbol timings. The configuration of the receiver of the wireless device 130 may be also referred to as a "receiver configuration", such as e.g., a customized BW for each symbol.

The bandwidth of reception of the one or more reference signals may be also referred to as an "RS reception bandwidth" or a number of units, e.g., RE, of the one or more reference signals in frequency, which may be also referred to as "number of REs in frequency".

Determining in this Action 203 may comprise deciding or calculating.

The determining in this Action 203 of the information may be based on the determined target level of accuracy in Action 201.

The determining in this Action 203 of the information may be based on the determined number of units in Action 202.

In some embodiments, the information may further comprise a number of occasions of reception in time, which may be also referred to as "reception occasions". In some of such embodiments, the one or more criteria, may comprise minimizing an overall energy consumption.

In some embodiments, the determining in this Action 203 of the information may comprise, or may be based on, balancing energy consumption savings gain due to time of monitoring, with additional energy consumed due to operation over a wider bandwidth. This may be performed by maximizing energy savings gain by determining a trade-off between reduced time of monitoring and additional instantaneous power consumed due to operation over a wider bandwidth. That is, for example, the determining of Action 203 of the information may comprise, or may be based on, maximizing energy savings gain by determining a trade-off between reduced time of monitoring and additional instantaneous power consumed due to operation over a wider bandwidth. For example, the wireless device 130 may operate a wider BW if this may allow collecting a sufficient number of REs during a shorter monitoring time interval.

In some particular examples, this Action 203 may comprise determining a RS reception pattern, e.g., symbol timings, and receiver configuration, e.g., customized BW for each symbol, to obtain the required REs with minimum power consumption.

For example, the wireless device 130 may determine which RS, e.g., SSB and/or TRS occasions, how widely in BW, and how widely in time, e.g., how many SSB/TRS symbols, may need to be captured to obtain the required number of REs with minimal energy consumption.

As a general rule, the wireless device 130 may preferably obtain the required number of REs during the shortest possible time, using, if necessary, a wider-BW receiver configuration. However, the wireless device 130 may balance its energy consumption gains due to short monitoring and/or intermediate sleep and additional energy consumed due to wider BW operation.

To determine the most power-efficient configuration, the wireless device 130 may use a predetermined power consumption model where the impact of sampling and data processing operation at different BWs may be estimated, as well as power levels corresponding to waking up to monitor RS and transitioning to and from sleep states. Such a model may be created based on generic UE processing analysis or based on detailed previous measurements of the current UE design.

If using a wider BW and collecting additional REs allows the wireless device 130 to return to deep sleep faster, the wireless device 130 may preferably utilize additional REs of TRS. If faster sleep is not possible, e.g. the wireless device 130 may be already utilizing the RS that lie closest possible to its Paging Occasion (PO), the wireless device 130 may instead operate at a lower BW and capture multiple RS, e.g., SB, TRS, symbols.

In one example, the wireless device 130 may choose a single TRS occasion symbol if it may provide the required number of REs. Alternatively, it may choose to use the two TRS symbols at half the BW if there may be an energy overhead in switching to a wider BW, or if the wireless device 130 may need to remain outside of deep sleep after the first TRS symbol, e.g., due to upcoming paging monitoring, PO.

If, e.g., at a high SINR, a single SSB provides a sufficient number of REs, the wireless device 130 may choose an SSB or a TRS, using the same receiver BW, depending on which of those is closer to the upcoming PO.

More examples of possible TRS/SSB timing relations and reception choices may be considered.

In addition to BW adaptations of the RSs received in idle mode, the wireless device 130 may choose to also adapt its number of RX antennas to achieve more power savings. In one example, the wireless device 130 may need two RSs occasion with 2Rx antennas, while only one RS occasion with 4 Rx antennas, and thus if the latter leads to a lower power consumption, the wireless device 130 may employ the 4 Rx antennas in order to reduce the power consumption. In another example, the wireless device 130 may need only one occasion for both 2 Rx and 4 Rx antennas, and thus the wireless device 130 may decide to employ 2 Rx antennas, in order to reduce the power consumption.

By determining the information, e.g., one or more settings, to apply in the wireless device 130 to receive the one or more reference signals while the wireless device 130 is in inactive state or idle state, in this Action 203, the wireless device 130 may be enabled to maximize the energy savings gain by determining the trade-off between reduced time of monitoring and additional instantaneous power consumed due to operation over a wider bandwidth, adapting the configuration to the target level of accuracy.

Action 204

In this Action 204, the wireless device 130 receives the one or more reference signals based on the determined information. The receiving in this Action 204 of the one or more reference signals is performed while the wireless device 130 is in one or inactive state or idle state.

The receiving in this Action 204 may be performed, e.g., via the first link 141.

The receiving in this Action 204 of the one or more reference signals may be based on the determined information.

For example, this Action 204 may comprise receiving TRS using the selected configuration and corresponding Hardware (HW) adaptation, e.g., selectivity filter, sampling rate.

In some embodiments, the receiving in this Action 204 of the one or more reference signals may be in the cell 120, e.g., from the network node 110. The one or more reference signals may be configured to be received at least one of: a) by a group, e.g., a majority, of other wireless devices 140 in the cell 120 only in connected state, and b) in a group, e.g., a majority, of reception occasions, in the cell 120 only in connected state.

For example, the wireless device 130 may perform sample acquisition of the selected RS using the determined receiver configuration, e.g., the time occasions and reception BW.

The wireless device 130 may dynamically adapt selectivity/anti-aliasing filter according to the selected BW for receiving a given RS symbol, e.g., TRS or SSB, and perform sampling at the rate required for the selected BW to minimize the power consumption.

By, in this Action 204, receiving the one or more reference signals based on the determined information, the wireless device 130 may be enabled to receive the one or more reference signals while maximizing the energy savings gain, considering the target level of accuracy.

Action 205

In this Action 205, the wireless device 130 may perform the one or more tasks based on the received one or more reference signals.

The one or more tasks may comprise performing processing operations for which criteria may have been determined in Action 201, e.g. to achieve T/F synchronization or to perform link quality measurements. For example, this Action 204 may comprise performing the receiver processing.

By, in this Action 205, performing the one or more tasks based on the received one or more reference signals, the wireless device 130 may be enabled to perform the one or more tasks with target level of accuracy, while maximizing the energy savings gain.

Some embodiments herein will now be further described with some non-limiting examples.

In the following description, any reference to a/the UE, or simply "UE" may be understood to equally refer the wireless device 130; any reference to a/the gNB, a/the NW and/or a/the network may be understood to equally refer to the network node 110; any reference to a/the cell may be understood to equally refer to the cell 120.

Figure 3:
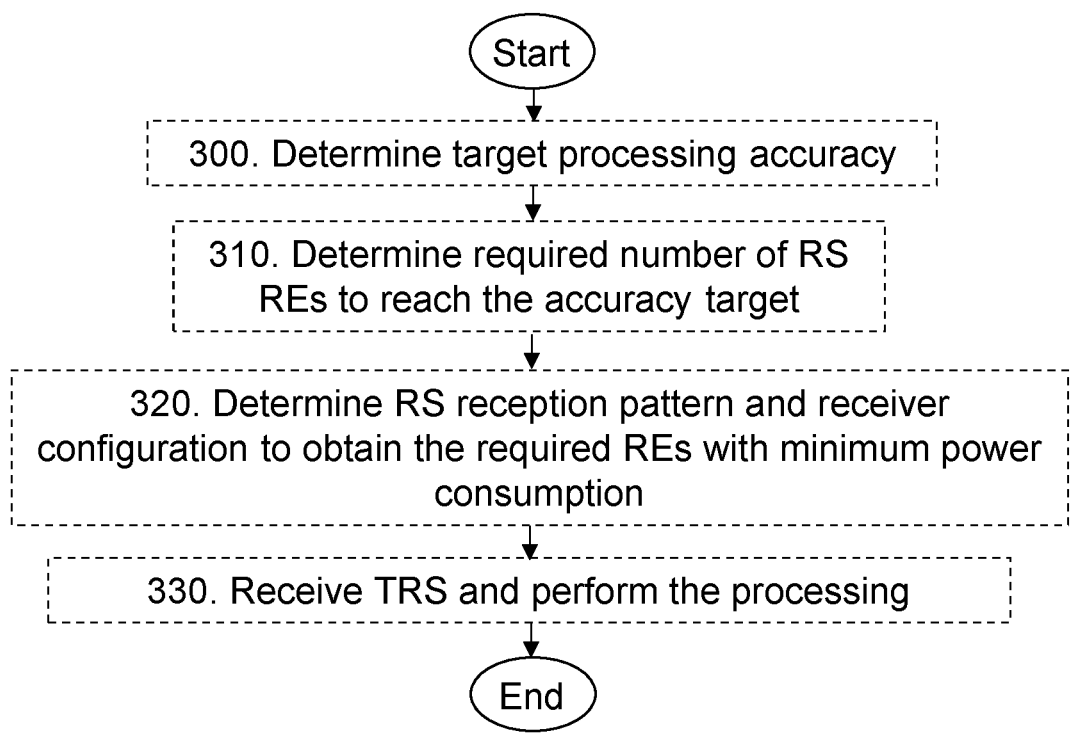
FIG. 3 is a flowchart depicting a non-limiting example of a method in a wireless device, according to embodiments herein.

A particular non-limiting example of embodiments herein is depicted in FIG. 3, the details of which are described next. Actions 300, 310, 320, 320 and 330 may be considered examples of Actions 201, 202, 203, and 204 and 205, respectively. The description provided for each of the Actions in FIG. 2 may be understood to equally apply to the corresponding actions in FIG. 3. In action 300, the wireless device 130 may determine the target, e.g., required, accuracy or performance metric for upcoming processing for which TRS may be utilized, that is, the target processing accuracy. In 310, the wireless device 130 may then determine the number of REs that may be required to obtain the target accuracy/performance, that is, the required number of RS REs to reach the accuracy target. In 320, the wireless device 130 may determine which RS reception pattern and receiver configuration to obtain the required REs with minimum power consumption. In 330, the wireless device 130 may receive the TRS and perform the processing.

As a summarized overview of the foregoing, examples of embodiments herein may relate to a method in a UE for power-efficient RS reception, comprising: a) determining a target accuracy for a receiver processing operation, e.g., sync quality, measurement quality, b) determining a required number of RS REs to reach the target accuracy, e.g., given link quality, receiver state, also including coherently combining constraints, and c) determining a RS reception pattern, e.g., symbol timings, and receiver configuration, e.g., customized BW for each symbol, to obtain the required REs with minimum power consumption.

In some examples, the method may further comprise receiving TRS using the selected configuration and corresponding HW adaptation, e.g., selectivity filter, sampling rate, and performing the receiver processing.

In some examples, the RS may be TRS.

In some examples, the RS may be SSB, and the required number of RS REs may correspond to SSB subcarriers and/or SSB occasions.

Certain embodiments disclosed herein may provide one or more of the following technical advantage(s), which may be summarized as follows. Embodiments herein may be understood to provide mechanisms so that the wireless device 130, e.g., a UE, may select a suitable set of TRS reception parameters in order to maximize power savings with maintained reception/measurement performance.

Figure 4:
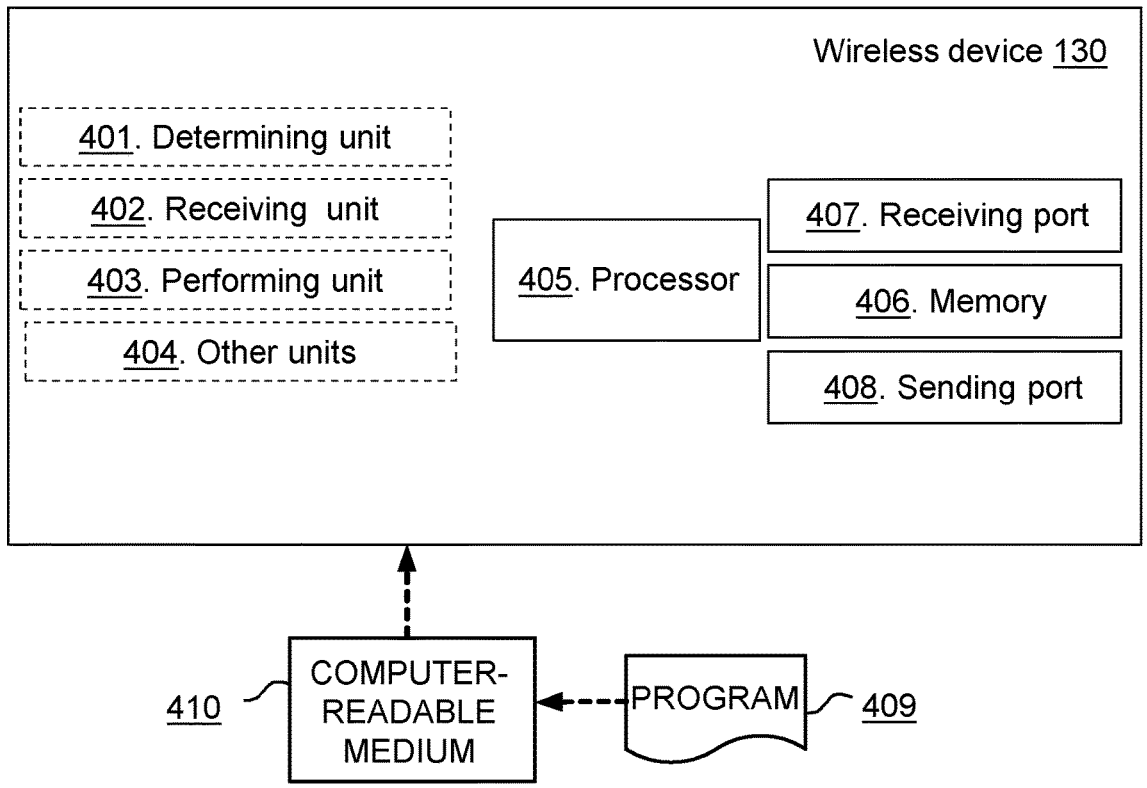
FIG. 4 is a schematic block diagram illustrating two embodiments, in panel a) and panel b), of a wireless device, according to embodiments herein.
Figure 4:
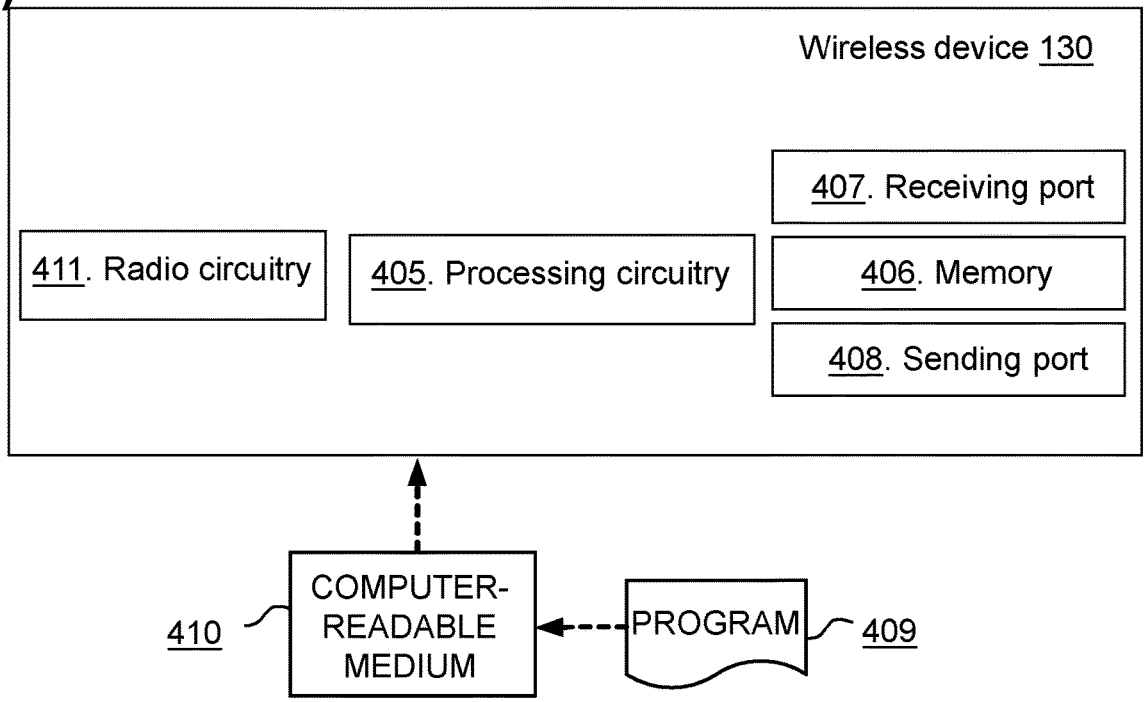

FIG. 4 depicts two different examples in panels a) and b), respectively, of the arrangement that the wireless device 130 may comprise to perform the method actions described above in relation to FIG. 3 and/or FIG. 4. In some embodiments, the wireless device 130 may comprise the following arrangement depicted in FIG. 4a. The wireless device 130 may be understood to be for handling the reception of the one or more reference signals. The wireless device 130 is configured to operate in the wireless communications network 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the wireless device 130 and will thus not be repeated here. For example, in some embodiments, the wireless communications network 100 may be configured to support at least one of: New Radio (NR), Long Term Evolution (LTE), LTE for Machines (LTE-M), enhanced Machine Type Communication (eMTC), and Narrow Band Internet of Things (NB-IoT).

In FIG. 4, optional units are indicated with dashed boxes.

The wireless device 130 is configured to perform the determining of Action 203, e.g. by means of a determining unit 401 within the wireless device 130, configured to determine information to apply in the wireless device 130. The information is configured to be to receive the one or more reference signals while the wireless device 130 is in one or inactive state or idle state. The one or more reference signals are configured to be used by the wireless device 130 to perform the one or more tasks. The determining is configured to be based on the one or more criteria. The one or more criteria are configured to comprise the criterion of power consumption and the target level of accuracy to be achieved in the performance of the one or more tasks. The information is configured to comprise: the pattern of reception of the one or more reference signals, and the configuration of the receiver of the wireless device 130. The information is configured to comprise the bandwidth of reception of the one or more reference signals.

The wireless device 130 is configured to perform the receiving of Action 204, e.g., by means of a receiving unit 402, configured to receive the one or more reference signals based on the information configured to be determined. The receiving of the one or more reference signals is configured to be performed while the wireless device 130 is in one or inactive state or idle state.

In some embodiments, the receiving of the one or more reference signals may be configured to be in the cell 120. The one or more reference signals may be configured to be received at least one of: a) by the group of other wireless devices 140 in the cell 120 only in connected state, and b) in the group of reception occasions, in the cell 120 only in connected state.

In some embodiments, the one or more reference signals may be configured to comprise at least one of: a) the TRS, the SSB, and c) the CSI-RS.

The wireless device 130 may be configured to perform the determining of Action 201, e.g. by means of the determining unit 401, configured to determine the target level of accuracy to be achieved in the performance of the one or more tasks. The determining of the information may be configured to be based on the target level of accuracy configured to be determined.

The wireless device 130 may be configured to perform the determining of Action 202, e.g. by means of the determining unit 401, configured to, determine, based on the target level of accuracy configured to be determined, the number of units of the one or more reference signals that may be configured to be to be received. The determining of the information may be configured to be based on the number of units configured to be determined.

The wireless device 130 may be configured to perform the performing of Action 205, e.g. by means of a performing unit 403 within the wireless device 130, configured to, perform the one or more tasks based on the one or more reference signals configured to be received.

In some embodiments, the information may be further configured to comprise the number of occasions of reception in time. The one or more criteria may be configured to comprise minimizing the overall energy consumption.

In some embodiments, the determining of the information may be configured to comprise balancing energy consumption savings gain due to time of monitoring, with additional energy configured to be consumed due to operation over a wider bandwidth by maximizing energy savings gain by determining a trade-off between reduced time of monitoring and additional instantaneous power consumed due to the operation over the wider bandwidth.

Other units 404 may be comprised in the wireless device 130.

The embodiments herein in the wireless device 130 may be implemented through one or more processors, such as a processor 405 in the wireless device 130 depicted in FIG. 4a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 406 comprising one or more memory units. The memory 406 is arranged to be used to store obtained information, store data, configurations, schedulings, and applications etc. to perform the methods herein when being executed in the wireless device 130.

In some embodiments, the wireless device 130 may receive information from, e.g., the network node 110, through a receiving port 407. In some embodiments, the receiving port 407 may be, for example, connected to one or more antennas in wireless device 130. In other embodiments, the wireless device 130 may receive information from another structure in the wireless communications network 100 through the receiving port 407. Since the receiving port 407 may be in communication with the processor 405, the receiving port 407 may then send the received information to the processor 405. The receiving port 407 may also be configured to receive other information.

The processor 405 in the wireless device 130 may be further configured to transmit or send information to e.g., the network node 110, or another structure in the wireless communications network 100, through a sending port 408, which may be in communication with the processor 405, and the memory 406.

Those skilled in the art will also appreciate that the different units 401-404 described above may refer to a combination of analog and digital modules, and/or one or more processors configured with software and/or firmware, e.g., stored in memory, that, when executed by the one or more processors such as the processor 405, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 401-404 described above may be implemented as one or more applications running on one or more processors such as the processor 405.

Thus, the methods according to the embodiments described herein for the wireless device 130 may be respectively implemented by means of a computer program 409 product, comprising instructions, i.e., software code portions, which, when executed on at least one processor 405, cause the at least one processor 405 to carry out the actions described herein, as performed by the wireless device 130. The computer program 409 product may be stored on a computer-readable storage medium 410. The computer-readable storage medium 410, having stored thereon the computer program 409, may comprise instructions which, when executed on at least one processor 405, cause the at least one processor 405 to carry out the actions described herein, as performed by the wireless device 130. In some embodiments, the computer-readable storage medium 410 may be a non-transitory computer-readable storage medium, such as a CD ROM disc, or a memory stick. In other embodiments, the computer program 409 product may be stored on a carrier containing the computer program 409 just described, wherein the carrier is one of an electronic signal, optical signal, radio signal, or the computer-readable storage medium 410, as described above.

The wireless device 130 may comprise a communication interface configured to facilitate communications between the wireless device 130 and other nodes or devices, e.g., the network node 110. The interface may, for example, include a transceiver configured to transmit and receive radio signals over an air interface in accordance with a suitable standard.

In other embodiments, the wireless device 130 may comprise the following arrangement depicted in FIG. 4b.

The wireless device 130 may comprise a processing circuitry 405, e.g., one or more processors such as the processor 405, in the wireless device 130 and the memory 406. The wireless device 130 may also comprise a radio circuitry 411, which may comprise e.g., the receiving port 407 and the sending port 408. The processing circuitry 411 may be configured to, or operable to, perform the method actions according to FIG. 3 and/or FIG. 4, in a similar manner as that described in relation to FIG. 4a. The radio circuitry 411 may be configured to set up and maintain at least a wireless connection with the network node 110. Circuitry may be understood herein as a hardware component.

Hence, embodiments herein also relate to the wireless device 130 comprising the processing circuitry 405 and the memory 406, said memory 406 containing instructions executable by said processing circuitry 405, whereby the wireless device 130 is operative to perform the actions described herein in relation to the wireless device 130, e.g., in FIG. 3 and/or FIG. 4.

Embodiments herein may be related to RRC_IDLE/INACTIVE, measurements, loop convergence, paging signal reception.

EXAMPLES

Example 1. A method performed by a wireless device (130), the wireless device (130) operating in a wireless communications network (100), the method comprising:
  determining (203) information, e.g., one or more settings, to apply in the wireless device (130), the information being to receive one or more reference signals, wherein the one or more reference signals are to be used by the wireless device (130) to perform one or more tasks, the determining (203) being based on one or more criteria, e.g., the one or more criteria comprising a criterion of power consumption, e.g., achieving a minimum power consumption, and a target level of accuracy to be achieved in a performance of the one or more tasks, wherein the information comprises at least one of:
  a pattern of reception of the one or more reference signals, also referred to as a "RS reception pattern", such as e.g., symbol timings, and
  a configuration of a receiver of the wireless device (130), also referred to as a "receiver configuration", such as e.g., a customized BW for each symbol, and
  receiving (204) the one or more reference signals based on the determined information.

Example 2. The method according to example 1, wherein the receiving (204) of the one or more reference signals is to be performed while the wireless device (130) is in one or inactive state or idle state.

Example 3. The method according to any of examples 1-2, wherein the receiving (204) of the one or more reference signals is in a cell (120), wherein the one or more reference signals are configured to be received at least one of:
  by a group, e.g., a majority, of other wireless devices (140) in the cell (120) only in connected state, and
  in group, e.g., a majority, of reception occasions, in the cell (120) only in connected state.

Example 4. The method according to any of examples 1-3, wherein the one or more reference signals comprise at least one of:
  a Tracking Reference Signal, TRS,
  a Synchronization Signal Block, SSB, and
  Channel State Information Reference Signal, CSI-RS.

Example 5. The method according to any of examples 1-4, further comprising:
  determining (201) a target level of accuracy to be achieved in a performance of the one or more tasks, and wherein the determining (203) of the information is based on the determined target level of accuracy.

Example 6. The method according to example 5, further comprising:
  determining (202), based on the determined target level of accuracy, a number of units, e.g., RE, of the one or more reference signals that are to be received, e.g., to achieve the determined target level of accuracy, and wherein the determining (203) of the information is based on the determined number of units.

Example 7. The method according to any of examples 1-6, further comprising:
  performing (205) the one or more tasks based on the received one or more reference signals.

Example 8. The method according to any of examples 1-7, wherein the information comprises:
  a bandwidth of reception of the one or more reference signals, also referred to as "RS reception bandwidth" or a number of units, e.g., RE, of the one or more reference signals in frequency, also referred to as "number of REs in frequency", and
  a number of occasions of reception in time, also referred to "reception occasions", and wherein the one or more criteria comprise minimizing an overall energy consumption.

Example 9. The method according to any of examples 1-8, wherein the determining (203) of the information comprises, or is based on, balancing energy consumption gain due to time of monitoring, with additional energy consumed due to operation over a wider bandwidth, e.g., by maximizing energy savings gain by determining a trade-off between reduced time of monitoring and additional instantaneous power consumed due to operation over a wider bandwidth.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions and Variations

Figure 5:
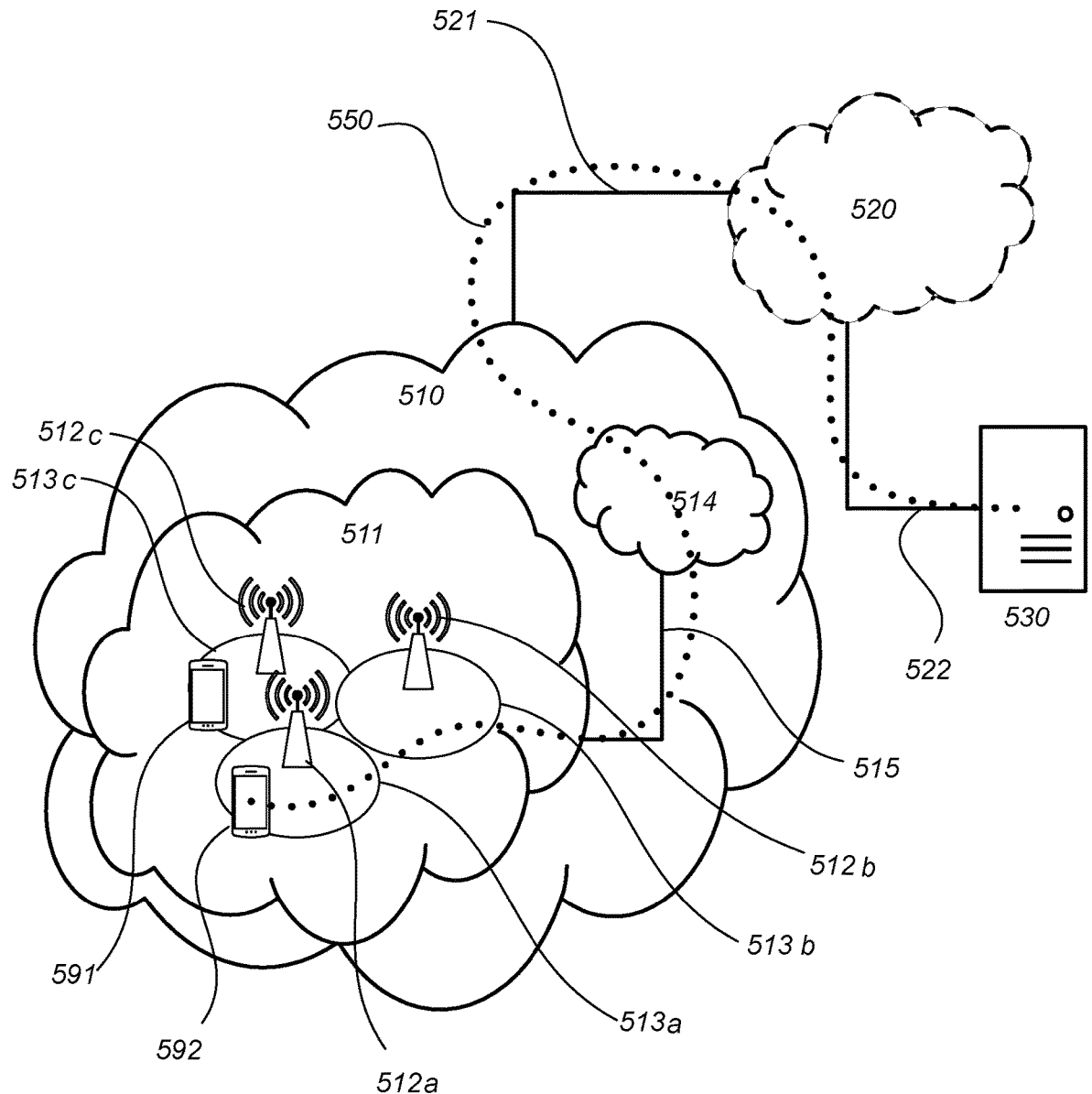
FIG. 5 is a schematic block diagram illustrating a telecommunication network connected via an intermediate network to a host computer, according to embodiments herein.

FIG. 5: Telecommunication Network Connected Via an Intermediate Network to a Host Computer in Accordance with Some Embodiments With reference to FIG. 5, in accordance with an embodiment, a communication system includes telecommunication network 510 such as the wireless communications network 100, for example, a 3GPP-type cellular network, which comprises access network 511, such as a radio access network, and core network 514. Access network 511 comprises a plurality of network nodes such as the network node 110. For example, base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A plurality of user equipments, such as the wireless device 130 are comprised in the wireless communications network 100. In FIG. 5, a first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512. Any of the UEs 591, 592 are examples of the wireless device 130.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more subnetworks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

In relation to FIGS. 6, 7, 8, 9, and 10, which are described next, it may be understood that a UE is an example of the wireless device 130, and that any description provided for the UE equally applies to the wireless device 130. It may be also understood that the base station is an example of the network node 110, and that any description provided for the base station equally applies to the network node 110.

Figure 6:
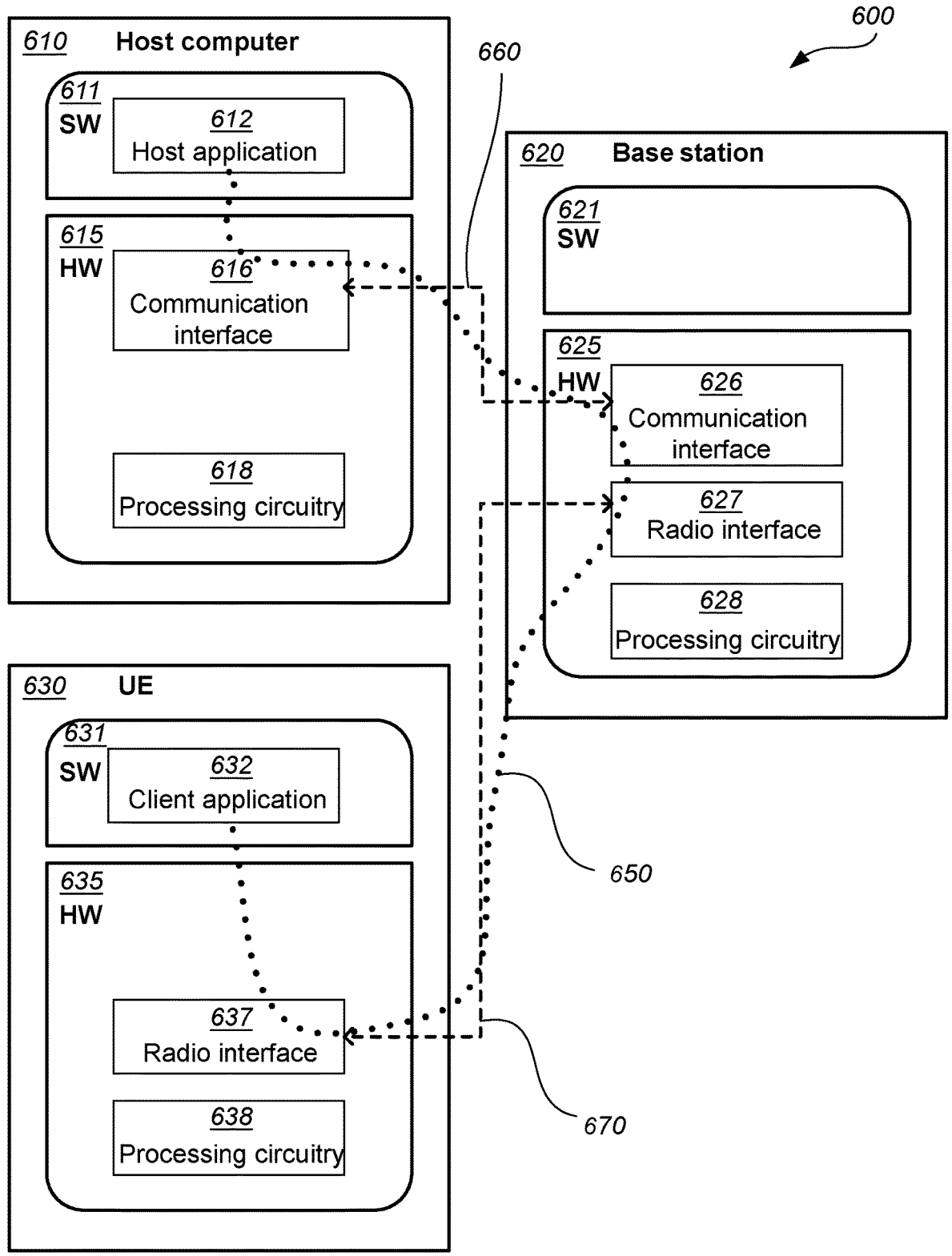
FIG. 6 is a generalized block diagram of a host computer communicating via a base station with a user equipment over a partially wireless connection, according to embodiments herein.

FIG. 6: Host Computer Communicating Via a Base Station with a User Equipment Over a Partially Wireless Connection in Accordance with Some Embodiments Example implementations, in accordance with an embodiment, of the wireless device 130, e.g., a UE, the network node 110, e.g., a base station and host computer discussed in the preceding paragraphs will now be described with reference to FIG. 6. In communication system 600, such as the wireless communications network 100, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes the network node 110, exemplified in FIG. 6 as a base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with the wireless device 130, exemplified in FIG. 6 as a UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

The wireless device 130 embodiments relate to FIG. 2, FIG. 3, FIG. 4 and FIGS. 5-10.

The wireless device 130 may also be configured to communicate user data with a host application unit in a host computer 610, e.g., via another link such as 660.

The wireless device 130 may comprise an interface unit to facilitate communications between the wireless device 130 and other nodes or devices, e.g., the network node 110, the host computer 610, or any of the other nodes. In some particular examples, the interface may, for example, include a transceiver configured to transmit and receive radio signals over an air interface in accordance with a suitable standard.

The wireless device 130 may comprise an arrangement as shown in FIG. 4 or in FIG. 6.

FIG. 7: Methods Implemented in a Communication System Including a Host Computer, a Base Station and a User Equipment in Accordance with Some Embodiments FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

FIG. 8: Methods Implemented in a Communication System Including a Host Computer, a Base Station and a User Equipment in Accordance with Some Embodiments FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figures 9, 10:
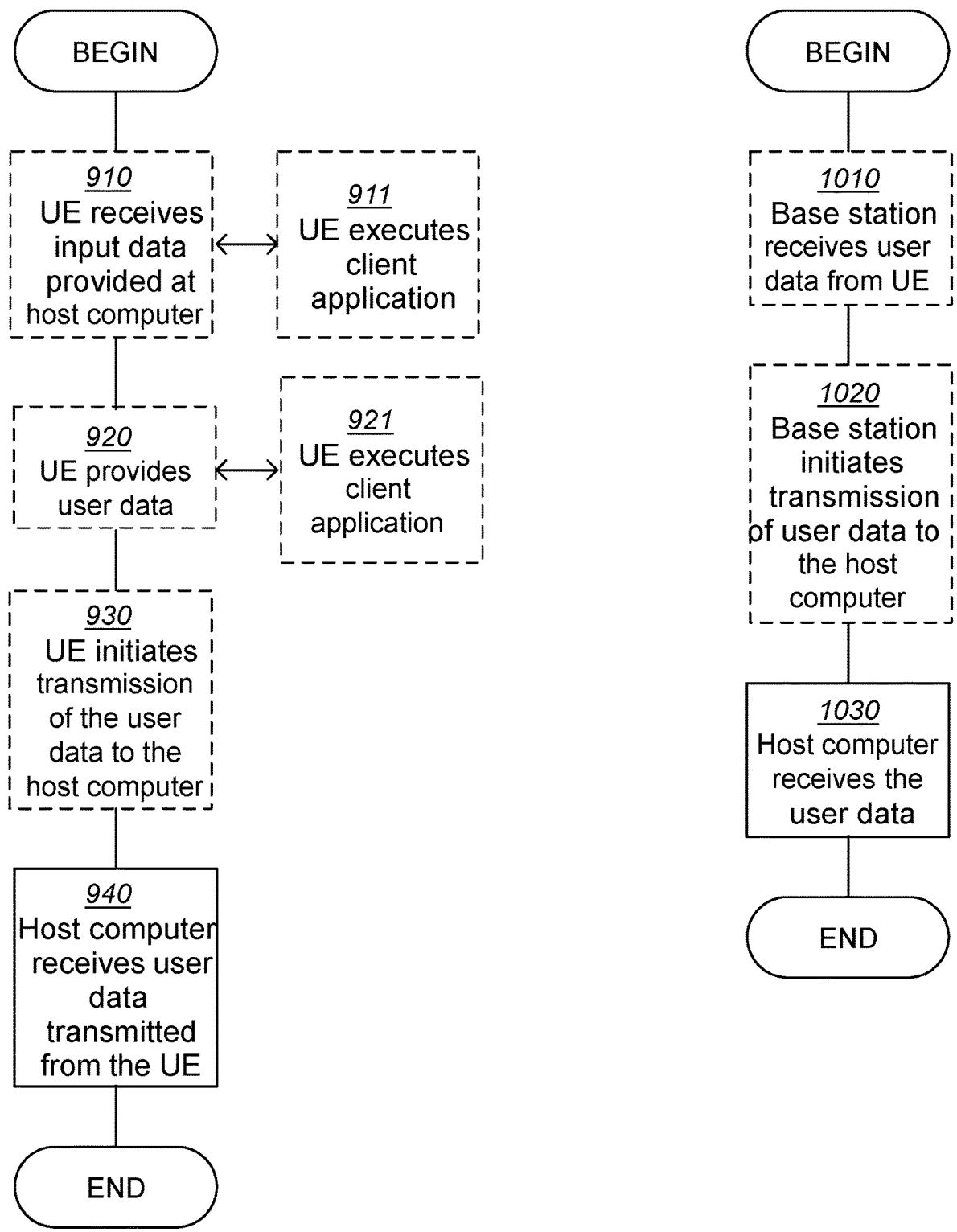
FIG. 9 is a flowchart depicting embodiments of a method in a communications system including a host computer, a base station and a user equipment, according to embodiments herein.
FIG. 10 is a flowchart depicting embodiments of a method in a communications system including a host computer, a base station and a user equipment, according to embodiments herein.

FIG. 9: Methods Implemented in a Communication System Including a Host Computer, a Base Station and a User Equipment in Accordance with Some Embodiments FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

FIG. 10: Methods Implemented in a Communication System Including a Host Computer, a Base Station and a User Equipment in Accordance with Some Embodiments FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FURTHER NUMBERED EMBODIMENTS

1. A base station configured to communicate with a user equipment (UE), the base station comprising a radio interface and processing circuitry configured to perform one or more of the actions described herein as performed by the network node 110.

5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:
   the processing circuitry of the host computer is configured to execute a host application, thereby providing the user data; and
   the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by the network node 110.

16. The method of embodiment 15, further comprising:
   at the base station, transmitting the user data.

17. The method of embodiment 16, wherein the user data is provided at the host computer by executing a host application, the method further comprising:
   at the UE, executing a client application associated with the host application.

21. A user equipment (UE) configured to communicate with a base station, the UE comprising a radio interface and processing circuitry configured to perform one or more of the actions described herein as performed by the wireless device 130.

25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the wireless device 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the wireless device 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
providing user data; and
forwarding the user data to a host computer via the transmission to the base station.

55. A method implemented in a communication system including a host computer, a base station and a user equipment (UE), the method comprising:
at the host computer, receiving user data transmitted to the base station from the UE, wherein the UE performs one or more of the actions described herein as performed by the wireless device 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the wireless device 130.

76. The method of embodiment 75, further comprising:
at the base station, receiving the user data from the UE.

77. The method of embodiment 76, further comprising:
at the base station, initiating a transmission of the received user data to the host computer.

The invention claimed is:

1. A method performed by a wireless device, the wireless device operating in a wireless communications network, the method comprising:
determining information to apply in the wireless device, the information being to receive one or more reference signals while the wireless device is in one or inactive state or idle state, the one or more reference signals being usable by the wireless device to perform one or more tasks, the determining being based on one or more criteria, the one or more criteria comprising a criterion of power consumption, and a target level of accuracy to be achieved in a performance of the one or more tasks, the information comprising:
- a pattern of reception of the one or more reference signals; and
- a configuration of a receiver of the wireless device, the information comprises comprising a bandwidth of reception of the one or more reference signals;

the pattern of reception being determined to obtain a required number of Resource Elements, REs, with minimum power consumption; and receiving the one or more reference signals based on the determined information, the receiving of the one or more reference signals being performed while the wireless device is in one or inactive state or idle state.

2. The method according to claim 1, wherein the receiving of the one or more reference signals is in a cell, wherein the one or more reference signals are configured to be received at least one of:
- by a group of other wireless devices in the cell only in connected state; and
- in a group of reception occasions, in the cell only in connected state.

3. The method according to claim 2, wherein the one or more reference signals comprise at least one of:
- a Tracking Reference Signal, TRS;
- a Synchronization Signal Block, SSB; and
- a Channel State Information Reference Signal, CSI-RS.

4. The method according to claim 2, further comprising: determining a target level of accuracy to be achieved in a performance of the one or more tasks, and wherein the determining of the information is based on the determined target level of accuracy.

5. The method according to claim 2, further comprising: performing the one or more tasks based on the received one or more reference signals.

6. The method according to claim 1, wherein the one or more reference signals comprise at least one of:
- a Tracking Reference Signal, TRS;
- a Synchronization Signal Block, SSB; and
- a Channel State Information Reference Signal, CSI-RS.

7. The method according to claim 1, further comprising: determining a target level of accuracy to be achieved in a performance of the one or more tasks, and wherein the determining of the information is based on the determined target level of accuracy.

8. The method according to claim 7, further comprising: determining, based on the determined target level of accuracy, a number of units of the one or more reference signals that are to be received, and wherein the determining of the information is based on the determined number of units.

9. The method according to claim 1, further comprising: performing the one or more tasks based on the received one or more reference signals.

10. The method according to claim 1, wherein the information further comprises a number of occasions of reception in time, and wherein the one or more criteria comprise minimizing an overall energy consumption.

11. The method according to claim 1, wherein the determining of the information comprises balancing energy consumption savings gain due to time of monitoring, with additional energy consumed due to operation over a wider bandwidth by maximizing energy savings gain by determining a trade-off between reduced time of monitoring and additional instantaneous power consumed due to operation over a wider bandwidth.

12. A computer storage medium storing a computer program, comprising instructions which, when executed on at least one processor, cause the at least one processor to carry out a method, the method comprising:
determining information to apply in a wireless device, the information being to receive one or more reference signals while the wireless device is in one or inactive state or idle state, the one or more reference signals being usable by the wireless device to perform one or more tasks, the determining being based on one or more criteria, the one or more criteria comprising a criterion of power consumption, and a target level of accuracy to be achieved in a performance of the one or more tasks, the information comprising:
- a pattern of reception of the one or more reference signals; and
- a configuration of a receiver of the wireless device, the information comprises comprising a bandwidth of reception of the one or more reference signals;

the pattern of reception being determined to obtain a required number of Resource Elements, REs, with minimum power consumption; and receiving the one or more reference signals based on the determined information, the receiving of the one or more reference signals being performed while the wireless device is in one or inactive state or idle state.

13. A wireless device, the wireless device being configured to operate in a wireless communications network, the wireless device being further configured to:
determine information to apply in the wireless device, the information being configured to be to receive one or more reference signals while the wireless device is in one or inactive state or idle state, the one or more reference signals being configured to be used by the wireless device to perform one or more tasks, the determining being configured to be based on one or more criteria, the one or more criteria being configured to comprise a criterion of power consumption, and a target level of accuracy to be achieved in a performance of the one or more tasks, the information being configured to comprise:
- a pattern of reception of the one or more reference signals; and
- a configuration of a receiver of the wireless device, the information being configured to comprise a bandwidth of reception of the one or more reference signals;

the pattern of reception being determined to obtain a required number of Resource Elements, REs, with minimum power consumption; and receive the one or more reference signals based on the information configured to be determined, the receiving of the one or more reference signals being configured to be performed while the wireless device is in one or inactive state or idle state.

14. The wireless device according to claim 13, wherein the receiving of the one or more reference signals is configured to be in a cell, wherein the one or more reference signals are configured to be received at least one of:
- by a group of other wireless devices in the cell only in connected state; and
- in a group of reception occasions, in the cell only in connected state.

15. The wireless device according to claim 13, wherein the one or more reference signals are configured to comprise at least one of:
   a Tracking Reference Signal, TRS,
   a Synchronization Signal Block, SSB; and
   a Channel State Information Reference Signal, CSI-RS.

16. The wireless device according to claim 13, being further configured to:
   determine a target level of accuracy to be achieved in a performance of the one or more tasks, and wherein the determining of the information is configured to be based on the target level of accuracy configured to be determined.

17. The wireless device according to claim 16, further configured to:
   determine, based on the target level of accuracy configured to be determined, a number of units of the one or more reference signals that are configured to be to be received, and wherein the determining of the information is configured to be based on the number of units configured to be determined.

18. The wireless device according to claim 13, being further configured to:
   perform the one or more tasks based on the one or more reference signals configured to be received.

19. The wireless device according to claim 13, wherein the information is further configured to comprise a number of occasions of reception in time, and wherein the one or more criteria are configured to comprise minimizing an overall energy consumption.

20. The wireless device according to claim 13, wherein the determining of the information is configured to comprise balancing energy consumption savings gain due to time of monitoring, with additional energy configured to be consumed due to operation over a wider bandwidth by maximizing energy savings gain by determining a trade-off between reduced time of monitoring and additional instantaneous power consumed due to operation over a wider bandwidth.

* * * * *